United States Patent
Koumura

(10) Patent No.: US 7,380,883 B2
(45) Date of Patent: Jun. 3, 2008

(54) RECLINING APPARATUS

(75) Inventor: Mitsunao Koumura, Motosu (JP)

(73) Assignee: Kabushiki Kaisha Imasen Denki Seisakusho, Inuyama (JP)

( * ) Notice: Subject to any disclaimer, the term of this patent is extended or adjusted under 35 U.S.C. 154(b) by 0 days.

(21) Appl. No.: 11/849,351

(22) Filed: Sep. 3, 2007

(65) Prior Publication Data

US 2008/0048478 A1    Feb. 28, 2008

(51) Int. Cl.
*B60N 2/235* (2006.01)
(52) U.S. Cl. .................................... 297/367
(58) Field of Classification Search ........... 297/354.12, 297/366, 367, 368, 378.12
See application file for complete search history.

(56) References Cited

U.S. PATENT DOCUMENTS

| | | | | |
|---|---|---|---|---|
| 5,611,599 | A * | 3/1997 | Baloche et al. | 297/367 |
| 5,779,313 | A * | 7/1998 | Rohee | 297/367 |
| 6,007,153 | A * | 12/1999 | Benoit et al. | 297/378.12 |
| 6,082,821 | A * | 7/2000 | Baloche et al. | 297/354.12 |
| 6,439,663 | B1 * | 8/2002 | Ikegaya | 297/367 |
| 6,520,583 | B1 * | 2/2003 | Bonk | 297/367 |
| 6,554,361 | B2 * | 4/2003 | Reubeuze et al. | 297/367 |
| 7,055,906 | B2 * | 6/2006 | Shinozaki | 297/367 |
| 2002/0096924 | A1 * | 7/2002 | Reubeuze | 297/367 |
| 2005/0035640 | A1 | 2/2005 | Shinozaki | |

FOREIGN PATENT DOCUMENTS

| | | |
|---|---|---|
| EP | 1 566 117 A1 | 8/2005 |
| JP | H02-177908 A | 7/1990 |
| JP | H08-300990 A | 11/1996 |
| JP | 2001-211949 A | 8/2001 |
| JP | 3343039 B | 11/2002 |
| JP | 2004-173922 A | 6/2004 |
| WO | WO2004/047589 A1 | 6/2004 |

* cited by examiner

*Primary Examiner*—Peter R. Brown
(74) *Attorney, Agent, or Firm*—Hiroe and Associates; Michael L. Crapenhoft

(57) ABSTRACT

A compact and lightweight round reclining apparatus having a neutral position return function of automatically returning and securing the backrest to the preset neutral position when the backrest that has been reclined forward is raised is provided. A memory plate in approximately disc form having a center shaft at its center and a spring member for pressing the memory plate so that the memory plate always rotates in one direction intervene between a base plate and a gear plate. A guide portion, which is a long hole in approximately arc form, for restricting the movement of the lock gear outward in the direction of the radius through contact with the protrusion of the above described lock gear is provided inside the disc of the memory plate, and at least one notch is provided in the outer periphery of the memory plate so that an engaging portion provided on the above described gear plate enters into the notch and the memory plate is rotatable relative to the gear plate within the range of the notch.

6 Claims, 10 Drawing Sheets

RECLINING APPARATUS

BACKGROUND OF THE INVENTION

The present invention relates to a reclining apparatus installed in a seat for a vehicle, and in particular, to a reclining apparatus having a neutral position return function where the backrest which has been reclined forward through the operation by a passenger can be returned and secured to a preset position (within a range of an adjustment of the inclination angle) with a simple operation.

Various types of conventional apparatuses have been proposed as a reclining apparatus installed in a seat for a vehicle. From among these, reclining apparatuses which are mounted in seats in the front row of coupe style vehicles and three door hatchback style vehicles and seats in the second row of minivans and cab wagon style vehicles so that the passengers can get into and leave from the seats in the rear row are put into practice, and many vehicles are equipped with these. Such reclining apparatuses have a neutral position return function which makes it possible for the backrest to recline forward to a great degree and automatically return and be secured to the preset position (neutral position) by simply raising the above described backrest after the completion of getting into and leaving from the seats in the rear row.

Apparatuses such as those described in Japanese Unexamined Patent Publication H2 (1990)-177908, for example, are publicly known as reclining apparatuses having the above described neutral position return function. The apparatus described in this publication adopts a configuration wherein a sector plate 8, in which a sector gear 9 having external cogs is formed, is secured to a rotational bracket 5 on the backrest side, a lock plate 11, in which a lock gear 17 is formed, is secured to a stationary bracket 3 on the seat side with an axis, and a memory plate 20 for preventing the engagement between the sector gear 9 and the lock gear 17 under certain conditions is provided so as to intervene in between. Thus, the above described memory plate 20 works to allow the backrest to return and be secured to the preset neutral position simply by raising the backrest that has been reclined forward.

Meanwhile, as for compact and lightweight reclining apparatuses which can be easily attached to a seat, apparatuses which are referred to as round reclining apparatuses (circular reclining apparatuses) are put into practice. In these round reclining apparatuses, a base plate in approximately disc form and a gear plate in approximately disc form are combined so as to face each other, and a locking mechanism is provided in the internal space across which the two plates face each other so that the two plates rotate relative to each other with a center shaft as a fulcrum, making it possible to be secured at a desired position, or phase.

As a concrete configuration of these round reclining apparatuses, the one described in Japanese Patent No. 3343039, for example, is publicly known. In the apparatus described in this patent, two pegs 12 (corresponding to "protrusions") are formed so as to protrude from a follower 5 (corresponding to a "lock gear") in the direction of the axis, in addition to the above described respective components, so that one peg 12 allows the locking mechanism to be held in a released position in a predetermined range while the other peg 12 and a thin plate 14 having a circular orbit P (corresponding to a "guide hole") with a step, control the release of the lock. That is to say, the seats to which such an apparatus is attached have such a configuration that when the backrest is reclined forward at the time of getting into or leaving from the rear seat of the vehicle, the locking mechanism is maintained in a release position even after the operation of the operation member is released, and the backrest is returned and secured to the front end in the range of the adjustment (the highest raised position where the backrest is raised the most as long as it can be secured) when the backrest that has been reclined forward is raised.

In addition, a reclining apparatus is proposed in Japanese Unexamined Patent Publication H8 (1996)-300990 as a reclining apparatus where a function of returning and being secured to a position within the range of the adjustment is added to the above described round reclining apparatus, and a function (full memory function) of automatically returning to the original position where the angle has been adjusted to the angle before the backrest is reclined forward when the backrest is reclined backward starting from the forward reclined position is provided. The reclining apparatus described in this publication is provided with a ring 11 having a first side plate 8 (a plate in disc form) and a second side plate 9 (a plate in disc form) and a pair of internal cogs 19, with a locking and lock releasing mechanism M between the cogs 12 of the above described ring 11 and the first side plate 8 (a conventional angle adjustment mechanism) and a second mechanism (a full memory mechanism) for locking and lock releasing between the cogs 12 of the above described ring 11 and the second side plate 9, and for storing the adjusted location when working together with a crossing plate. That is to say, the round reclining apparatus according to this publication has a conventional mechanism M for adjusting the reclining angle, and a second mechanism for performing the full memory function, and thus adopts a configuration where the angle adjustment mechanisms in conventional reclining apparatuses are combined so as to be duplicated.

SUMMARY OF THE INVENTION

The technologies described in the above patent documents have disadvantages as follows. First, the reclining apparatus described in Japanese Unexamined Patent Publication H2 (1990)-177908 has a configuration in which a neutral position return function made of a sector plate 8, in which a sector gear 9 having external cogs is formed, a lock plate 11 where a lock gear 17 is formed, and a memory plate 20 for preventing the engagement between the sector gear 9 and the lock gear 17 under certain conditions is adopted. Therefore, when mass produced, it is difficult for such a neutral position return function to be incorporated in the round reclining apparatus where a base plate in approximately disc form and a gear plate in approximately disc form are combined so as to face each other, and a lock mechanism is provided in the internal space across which the two plates face each other.

In addition, the round reclining apparatus described in Japanese Patent No. 3343039 is provided with a follower 5 and a thin plate 14 in such a manner that two pegs 12 are formed in the follower 5 so that one peg 12 allows the locking mechanism to be maintained in the release position and the other peg 12 and the thin plate 14 control the lock release. Therefore, in this apparatus, though the backrest is kept in a forward reclined position even when the operation of the operation means is released, the backrest is returned and secured to the front end position in the range of the adjustment when the backrest is raised, and thus, a neutral position return function is not provided and the apparatus is insufficient in convenience.

In addition, in the round reclining apparatus described in Japanese Unexamined Patent Publication H8 (1996)-

300990, though a more convenient full memory function is provided, the apparatus has a conventional mechanism M for adjusting the angle, and a second mechanism for performing a full memory function, and therefore, angle adjustment mechanisms are combined so as to be duplicated in the configuration, making the apparatus large scale and the structure complicated, and there is a disadvantage that the apparatus becomes expensive.

The present invention is provided in order to solve the above described difficulties and disadvantages, and an object thereof is to provide a compact and lightweight round reclining apparatus having a neutral position return function which allows the backrest to automatically return and be secured to the preset neutral position when the backrest that has been reclined forward is raised.

Embodiments of the invention may include a reclining apparatus provided with a base plate in approximately disc form secured to either a seat cushion or a backrest of a seat, a gear plate in approximately disc form having internal cogs which is combined with the base plate so as to be rotatable and face the base plate 1, a number of lock gears having external cogs which can engage with the internal cogs of the above described gear plate, which are placed within a guide portion made of at least a pair of protrusions provided in the above described base plate so as to be moveable in the direction of the radius in the base plate, a cam 6 for controlling the movement of the above described lock gear in the direction of the radius so that the lock gear engages with the internal cogs of the gear plate, a spring for pressing the above described cam so that the cam rotates in such a direction that the above described lock gear engages with the above described internal cogs, a lever plate which rotates together with the above described cam and engages with a protrusion provided and protruded from in the above described lock gear so as to control the movement of the lock gear inward in the direction of the radius, a center shaft which penetrates through approximately the center of the above described base plate and gear plate so as to be rotatable together with the cam, and an operation member which is connected to the center shaft so as to rotate and drive the center shaft against the force of the above described spring, in which the configuration is characterized in that a memory plate in approximately disc form having the above described center shaft at the center and a spring member for pressing the memory plate in one direction so that the memory plate always rotates to intervene between the above described base plate and gear plate, a guide portion, which is a long hole in approximately arc form for restricting the movement of the lock gear outwards in the direction of the radius through contact with the protrusion of the above described lock gear, is provided and protruded inside the disc of the memory plate, at least one notch is provided in the outer periphery of the memory plate so that an engaging portion provided in and protruding from the above described gear plate enters into the notch and the memory plate is rotatable relative to the gear plate within the range of the notch, when the backrest is in a range from the most forward reclined position to the highest raised position, the protrusion of the above described lock gear makes contact with the above described guide portion so as to form a lock free range where the external cogs of the lock gear are released from the engagement with the internal cogs of the gear plate, when the backrest is in a range from the highest raised position to the most backward reclined position, the protrusion of the above described lock gear is released from making contact with the above described guide portion so as to form a range of the adjustment where the external cogs of the lock gear engage with the internal cogs of the gear plate, the above described spring member presses the memory plate so that the memory plate rotates in such a direction that the protrusion of the lock gear disengages from the guide portion, and when the backrest is reclined backward in a state where the protrusion of the above described lock gear makes contact with the guide portion of the above described memory plate, the memory plate rotates together with the base plate against the force of the above described spring members so that the protrusion of the above described lock gear is released from making contact with the above described guide portion and the external cogs of the lock gear engage with the internal cogs of the gear plate.

The memory plate and the spring member for pressing the memory plate in such a direction that the backrest always reclines backward relative to the gear plate implement the neutral position return function, and thus, the neutral position return function can be easily incorporated inside the compact and lightweight round reclining apparatus. In addition, the backrest that has returned to the neutral position makes it easy to sit down afterwards, and the reclining apparatus can be readjusted to the originally adjusted position or a desired adjusted position with a slight adjustment starting from the neutral position, and therefore, effects can be gained in which the apparatus is easy to use.

In some embodiments, the above described gear plate is formed in approximately bowl form having steps in stair form, in which a first step where the above described internal cogs are formed around the inner periphery of the opening, a second step of which the radius of the circumference is smaller than that of the first step and which slides against the outer periphery of the above described lever plate, and a third step of which the radius of the circumference is smaller than that of the second step and which slides against the outer periphery of the above described memory plate are formed, and the above described spring member is provided between the memory plate and the gear plate.

Where the gear plate is formed in approximately bowl form having steps in stair form in such a manner that the lever plate and the memory plate engage with these steps so as to be slidable, functions separated from each other can be collected in a layer structure, and in addition, the spring member is contained within the round reclining apparatus, and therefore, effects can be gained in which a compact and simple configuration can be implemented.

Some embodiments will include a base plate in approximately disc form secured to either a seat cushion or a backrest of a seat, a gear plate in approximately disc form having internal cogs, which is combined with the base plate so as to be rotatable and face the base plate, a number of lock gears having external cogs that can engage with the internal cogs of the above described gear plate, which are placed within a guide portion made of at least a pair of protrusions provided in the above described base plate so as to be moveable in the direction of the radius in the base plate, a cam for controlling the movement of the above described lock gear in the direction of the radius so that the lock gear engages with the internal cogs of the gear plate, a spring for pressing the above described cam so that the cam rotates in such a direction that the above described lock gear engages with the above described internal cogs, a lever plate that rotates together with the above described cam and engages with a protrusion provided in the above described lock gear so as to control the movement of the lock gear inward in the direction of the radius, a center shaft which penetrates through approximately the center of the above described base plate and gear plate so as to be rotatable together with the cam, and an operation member connected to the center shaft so as to rotate and drive the center shaft against the force of the above described spring, of which the configuration is characterized in that a memory plate in approximately ring form having the above described center shaft at the center and a spring member for pressing the memory plate in one direction so that the memory plate always rotates intervene between the above described base plate and gear plate, a guide portion in approximately arc form for restricting the movement of the lock gear outwards in the direction of the radius through contact with the protrusion of the above described lock gear is formed in the inner peripheral portion of the ring of the memory plate, at least one notch is provided in the outer periphery of the memory plate so that an engaging portion provided in and protruding from the above described gear plate enters into the notch and the memory plate is rotatable relative to the gear plate within the range of the notch when the backrest is in a range from the most forward reclined position to the highest raised position, the protrusion of the above described lock gear makes contact with the above described guide portion so as to form a lock free range where the external cogs of the lock gear are released from the engagement with the internal cogs of the gear plate, when the backrest is in a range from the highest raised position to the most backward reclined position, the protrusion of the above described lock gear is released from making contact with the above described guide portion so as to form a range of the adjustment where the external cogs of the lock gear engage with the internal cogs of the gear plate, the above described spring member presses the memory plate so that the memory plate rotates in such a direction that the protrusion of the lock gear disengages from the guide portion, and when the backrest is reclined backward in a state where the protrusion of the above described lock gear makes contact with the guide portion of the above described memory plate, the memory plate rotates together with the base plate against the force of the above described spring members so that the protrusion of the above described lock gear is released from making contact with the above described guide portion and the external cogs of the lock gear engage with the internal cogs of the gear plate.

The spring member for pressing the memory plate in such a direction that the backrest always reclines backward relative to the gear plate implements the neutral position return function, and thus, the neutral position return function can be easily incorporated inside the compact and lightweight round reclining apparatus. In addition, the backrest that has returned to the neutral position makes it easy to sit down afterwards, and the reclining apparatus can be readjusted to the originally adjusted position or a desired adjusted position with a slight adjustment starting from the neutral position, and therefore, effects can be gained in which the apparatus is easy to use.

In some embodiments, the above described gear plate is formed in approximately bowl form having steps in stair form, in which a first step where the above described internal cogs are formed around the inner periphery of the opening, a second step of which the radius of the circumference is smaller than that of the first step and which slides against the outer periphery of the above described lever plate, and a third step of which the radius of the circumference is smaller than that of the second step and which slides against the outer periphery of the above described memory plate are formed, the above described spring member is a spiral spring in such a form that the end on the outer side of the spiral is bent backward in the direction opposite to the direction in which the spiral winds and the end on the center side is bent in the same direction as the direction in which the spiral winds, where the end on the outer side engages with a hook portion in hook form provided on the inner periphery of the above described memory plate and the end on the center side engages with a protrusion in approximately columnar form provided and protruded from in the bottom portion of the gear plate, and the above described spiral spring is placed in the above described third step.

Where the gear plate is formed in approximately bowl form having steps in stair form in such a manner that the lever plate and the memory plate engage with these steps so as to be slidable, functions separated from each other can be collected in a layer structure, and in addition, the spring member is contained within the round reclining apparatus, and therefore, a compact and simple configuration can be implemented. In addition, the spring member is provided as a spiral spring in such a form that the end on the outer side of the spiral is bent backward in the direction opposite to the direction in which the spiral winds and the end on the center side is bent in the same direction as the direction in which the spiral winds, and the configuration allows the spring member to be placed inside the hallow memory plate, and therefore, effects can be gained in which the space for providing a spring member in the direction of the axis of the center shaft can be eliminated so as to make the configuration compact.

In some embodiments an arc portion where no internal cogs are formed is provided in the above described gear plate, and this arc portion is thicker in the direction of the radius than the internal cogs portions, an inclined portion, which inclines outward in the direction of the radius, is provided in an end portion of the guide portion provided in the above described memory plate, and when the backrest is reclined forward within the above described lock free range, the external cogs of the lock gear ride on the above described arc portion, and after that, the protrusion of the lock gear is moved towards the center along the radius by the above described inclined portion so as to be guided to and make contact with the guide portion.

Where the inner periphery of the gear plate is provided with an arc portion where no internal cogs are formed and which is thicker in the direction of the radius than the internal cogs, and an inclined portion which inclines outwards in the direction of the radius is provided in an end portion of the guide portion provided in the memory plate, and thus, when the backrest is reclined forward within the lock free range, the external cogs of the lock gear ride on the above described arc portion, and after that, the protrusion of the lock gear is moved toward the center along the radius by the above described inclined portion and guided to the guide portion. By providing such a configuration, effects can be gained in which the engagement between the lock gear and the gear plate in the vicinity of the highest raised position can be achieved without fail.

In some embodiments the periphery which reaches the end portion of the above described guide portion protrudes towards the center from the arc of the guide portion having the center shaft at the center.

Where the periphery which reaches the end portion of the guide portion protrudes toward the center from the arc of the guide portion having the center shaft at the center, effects can be gained in which the memory plate can be prevented from rotating by following the gear plate within a certain range where the above described memory plate is rotatable relative to the gear plate. In the case where the memory plate rotates without the notch of the memory plate making contact with the engaging portion of the gear plate through the friction between the periphery of the memory plate and the gear plate, the position where the external cogs of the lock engage with the internal cogs of the gear plate shifts from the center position by this amount. Therefore, the protrusion of the above described guide portion provides resistance against the rotation of the memory plate, and thus, it becomes possible for the notch of the memory plate to make contact with the engaging portion of the gear plate before the protrusion of the lock disengages from the guide portion.

DETAILED DESCRIPTION OF EMBODIMENTS AS EXAMPLES

FIGS. 1 to 9 show a reclining apparatus 105 according to the first embodiment. First, the outline of the present embodiment is described below.

Figure 1:
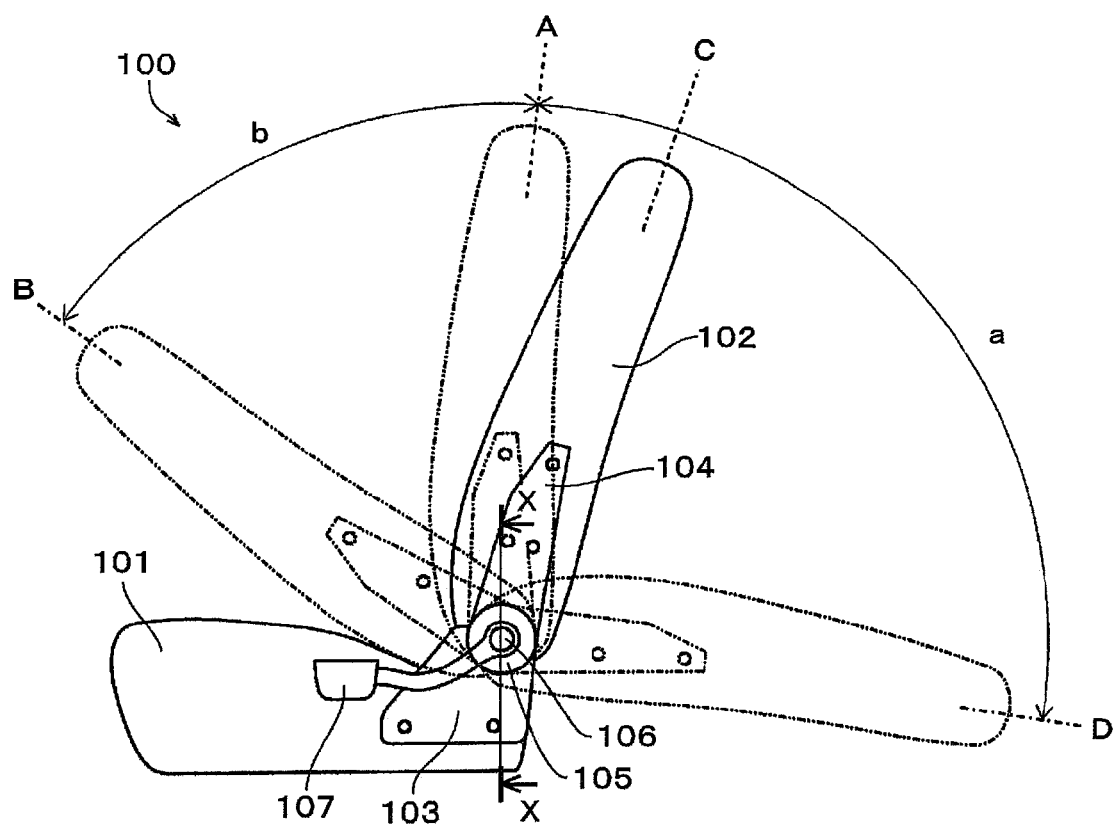
FIG. 1 is a side diagram showing a seat having a reclining apparatus 105 according to the first embodiment.

FIG. 1 is a diagram showing the state of a seat 100 having a seat cushion 101 and a backrest 102, to which a reclining apparatus 105 according to the present invention is attached, as viewed from the side of the seat 100. As shown in the cross sectional diagram of FIG. 2, in the reclining apparatus 105 according to the present embodiment, a base plate 1 in approximately disc form and a gear plate 2 in approximately disc form are combined so as to face each other. In the present invention, "in approximately disc form" means that the outer shape is round (circular form). One of these plates 1 or 2 is secured to a lower bracket 103, and the other plate is secured to upper bracket 104. As shown in FIG. 1, in the present embodiment, the lower end portion of the above-described lower bracket 103 is attached to the rear end portion of the seat cushion 101. Meanwhile, the upper end portion of the above-described upper bracket 104 is attached to the lower end portion of the backrest 102.

Figure 2:
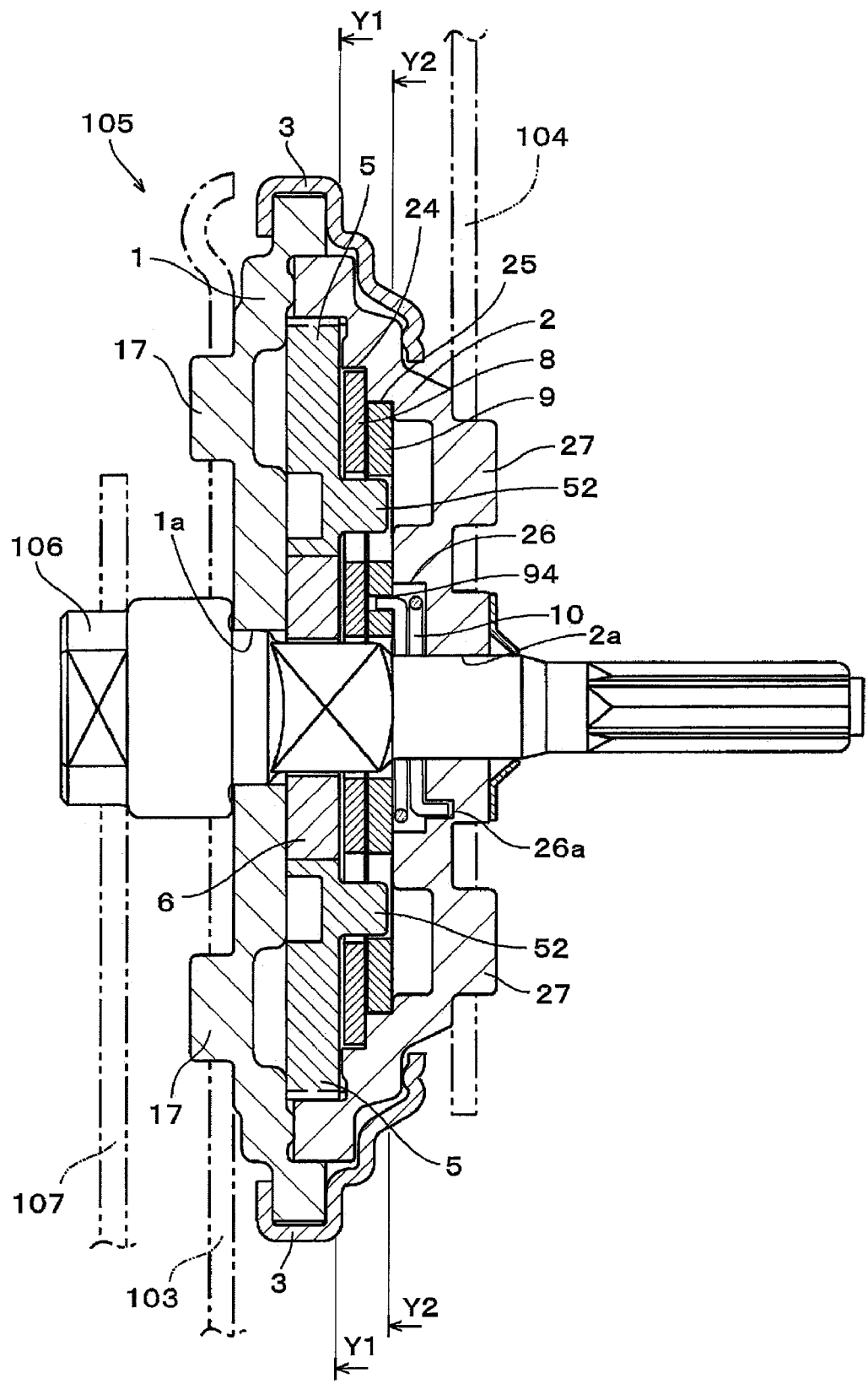
FIG. 2 is a cross sectional diagram showing the portion along line X-X in FIG. 1.

In FIGS. 1 and 2, symbol 106 indicates the center shaft provided at the center of the reclining apparatus 105, and symbol 107 indicates an operation lever of which one end is attached to the above described center shaft 106. When the locked state of the reclining apparatus 105 is released through the operation of this operation lever 107 by a passenger, the backrest 102 shown in FIG. 1 can be adjusted and secured at an arbitrary inclination angle within the range of adjustment a from the highest raised position A to the most reclined position D. In addition, the backrest 102 is not locked within the lock free range b from the highest raised position A to the most forward reclined position B even in a state where the operation lever 107 is released by the passenger.

Here, the position "C" in FIG. 1 is a neutral position where the backrest 102 automatically returns and is secured when the backrest 102 is raised from the most forward reclined position toward the backward reclined position, and the position having the highest possibility of being used when the passenger sits down is preset as the position C in the range of adjustment a. Therefore, it is easy to sit down when the backrest is in the neutral position C in comparison with when the backrest is at the highest raised position A, and in addition, with a slight adjustment, the backrest can be readjusted to the originally adjusted position or a desired adjusted position at which the backrest was locked before being reclined forward.

Next, a concrete configuration of the reclining apparatus 105 is described in detail in reference to FIGS. 2 to 8. In the reclining apparatus 105 according to the present embodiment, a base plate 1 in approximately disc form and a gear plate 2 in approximately disc form face each other, and a center shaft 106 penetrates through the center portion of these so that the base plate 1 and the gear plate 2 are rotatable around the center shaft 106 relative to each other. In addition, a ring member 3 is provided around the outer periphery of the circle of the reclining apparatus 105, and this ring member 3 is caulked, and thus, the outer peripheral portions of the above described base plate 1 and gear plate 2 are held so as not to separate from each other and to be slidable against each other.

In addition, a cavity (space) 4 is provided between the above described base plate 1 and gear plate 2, which face each other. A publicly known lock mechanism made of two lock gears 5 and 5, a center cam 6 and two spiral springs 7 and 7 and a lever plate 8 is contained within this cavity 4. In the same manner, a member which forms a neutral position return mechanism of a memory plate 9 and a coil spring 10 is also contained within the cavity 4.

A number of circular protrusions 17 and 27 are formed on the outer surfaces of the above described base plate 1 and gear plate 2 (surfaces opposite to the above described surfaces which face each other), respectively. The base plate 1 is attached to the lower bracket 103 with circular protrusions 17 while the gear plate 2 is attached to the upper bracket 104 with circular protrusions 27. Therefore, the base plate 1 and the gear plate 2 rotate around the center shaft 106 in the reclining apparatus 105 relative to each other, and the relative angle is fixed so that the relative rotation position of the lower bracket 103 and the upper bracket 104 is adjusted and secured, and the inclination angle of the backrest 102 relative to the seat cushion 101 is adjusted and fixed.

Figure 3:
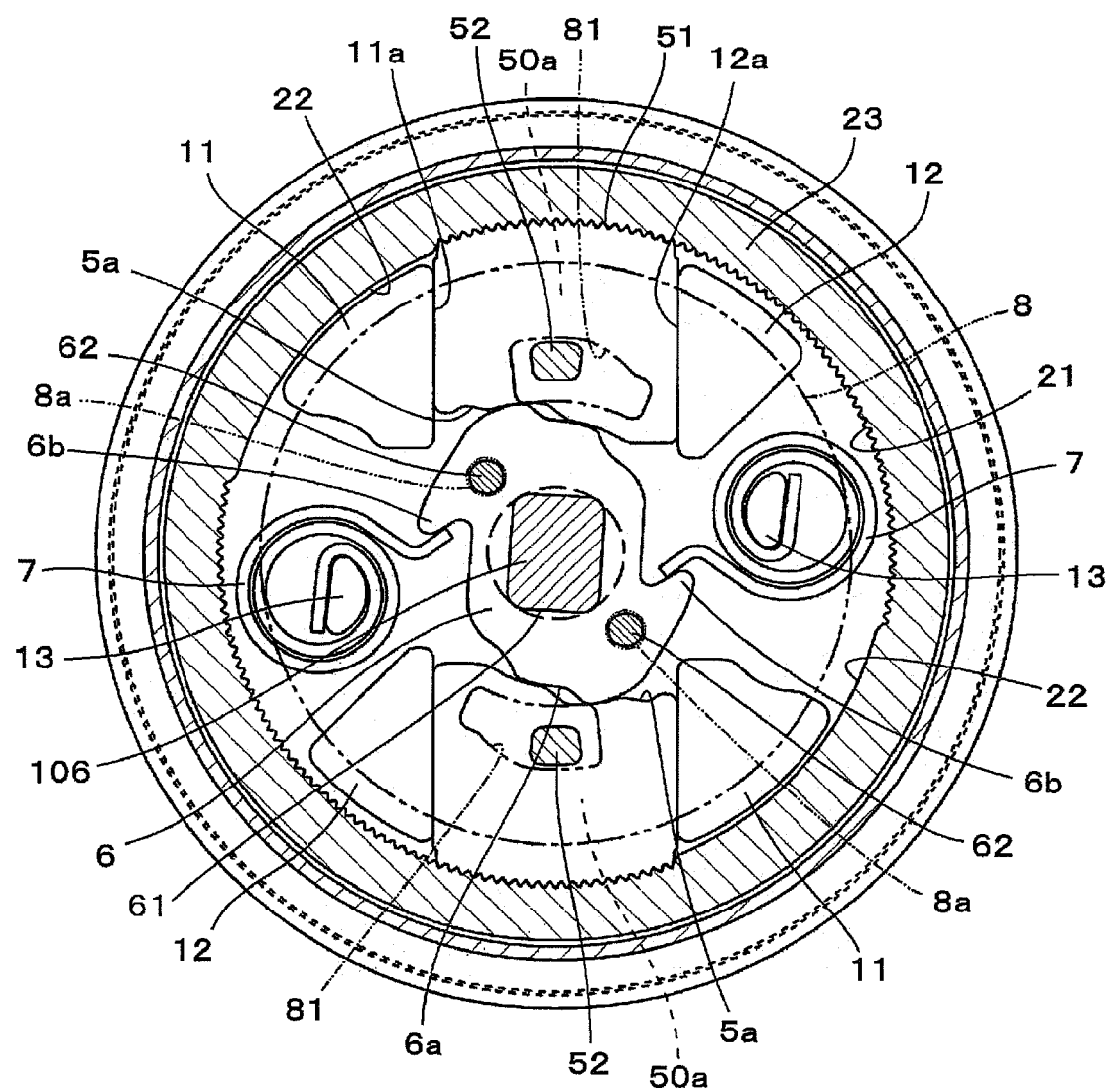
FIG. 3 is a cross sectional diagram showing the portion along line Y1-Y1 in FIG. 2.

The inner surface of the base plate 1 (the surface which faces the above described gear plate 2) is in approximately bowl form having steps in concentric circular form. A hole 1*a* through which the above described center shaft 106 penetrates is provided at the center. In addition, as shown in FIG. 3, a pair of guide portions 50*a* made of protrusions 11 and 12 are integrally formed on the inner surface of the base plate 1 through press processing. The two guide portions 50*a* are provided at symmetric positions relative to the above described hole 1*a*, and the surfaces 11*a* and 12*a* of the respective protrusions 11 and 12 which face each other are set so as to be parallel to each other. In addition, the lock gears 5 contained inside the two guide portions 50*a* are slidable in the direction of the radius of the base plate 1 in a state where they slide against the surfaces 11*a* and 12*a*.

The lock gears 5 contained in the above described guide portions 50*a* have a pair of parallel side walls which face the surfaces 11*a* and 12*a* of the above described protrusions 11 and 12, which face each other. External cogs 51 are formed in an end portion of a side which connects the pair of side walls (one end portion in the direction of the radius which slides within the above described guide portions 50*a*) and can engage with the internal cogs of the above described gear plate 2. A pressing portion 5*a* in curve form is formed on the other end portion in this lock gear 5 (end portion toward the center of the base plate 1), and it is possible for the pressing portion to make contact with the curved surface (cam surface) of the above described cam 6. In addition, protrusions 52 for guiding are integrally provided to the surface of this lock gear 5, which faces the gear plate 2.

A cam 6 is provided approximately at the center of the above described base plate 1 so as to intervene between the lock gears 5 and 5. This cam 6 is approximately in plate form and has a square hole 61 at the center through which the center shaft 106 penetrates and rotates together with the center shaft 106 when a passenger operates the above described operation lever 107. In addition, a pair of cam surfaces 6*a* is formed at locations which are rotationally symmetric with the square hole 61 of the above described cam 6 at the center. The cam surfaces 6*a* press the pressing portions 5*a* of the above described lock gears 5 when the cam 6 rotates. The lock gears 5 move to the outside in the direction of the radius of the base plate 1 when pressed by these cam surfaces 6*a*.

In addition, a pair of hook engaging portions 6*b* is integrally formed in this cam 6 so as to be adjacent to the above described cam surfaces 6*a* so that one end of each of the spiral springs 7 engages with its corresponding hook engaging portion. The center of each of the spiral springs 7, which is the other end with which the spiral spring 7; engages with the above described hook engaging portion 6*b*, engages with a half moon protrusion 13, which is integrally formed on the base plate 1. Here, these spiral springs 7 press the above described cams 6 so that the cams 6 rotate in such a direction that the lock gears 5 press the cams 6 outward in the direction of the radius (the clockwise direction in FIG. 3). In addition, a pair of protrusions 62 in columnar form are provided at locations which are rotationally symmetrical with the above described square hole 61 at the center in the direction towards the gear plate 2, and the cam is attached to the below described lever plate 8 so that they rotate together.

As shown in FIG. 3, a circular lever plate 8 (illustrated with a double dot chain line) is mounted on the lock gears 5, the cam 6 and the spiral springs 7, which are mounted on the above described base plate 1, and furthermore, is sandwiched between the base plate 1 and a base plate 2. This lever plate 8 has a circular hole in the center portion through which the center shaft 106 penetrates. The protrusions 62 in columnar form on the above described cam 6 engage with engaging holes 8*a* of the lever plate 8. Through this engagement, the cam 6 and the lever plate 8 move together.

A pair of cam holes 81 is provided in the above described lever plate 8 at locations that are rotationally symmetric with the center shaft 106 at the center. The protrusions 52 for guiding, which are provided in the above described lock gears 5, loosely engage with the above described cam holes 81. In addition, when the lever plate 8 rotates, the peripheries of the above described cam holes 81 make contact with the protrusions 52 so as to pull the protrusions toward the center in the direction of the radius, and thus, the lock gears 5 can be moved toward the center in the direction of the radius. Accordingly, the cam 6 rotates together with the center shaft 106. When the cam 6 rotates, the lock gears 5 move in the direction of the radius of the base plate 1.

The above described components are placed within the cavity 4 so as to be layered in the direction of the axis. The outer shape of the above described gear plate 2 is approximately disc form, with a hole 2*a* through which the center shaft 106 penetrates provided in the center portion. In addition, the inner surface facing the base plate 1 is in approximately bowl form where a first step 23 provided with internal cogs 21 and arc portions 22 on the inner periphery, a second step 24 placed inside thereof and a third step 25 are sequentially formed in stair form in the direction of the axis. In addition, the first step 23 of the gear plate 2 engages with the outer form portion (inside the outer periphery) of the base plate 1 so that the external cogs 51 are set to disengage from the internal cogs 21 of the gear plate 2 as the above described lock gears 5 slide in the direction of the radius.

In addition, in the case where the operation lever 107 is not operated by a passenger, the spiral springs 7 press the cam 6 and the lever plate 8 so that they rotate together, and the external cogs 51 of the lock gear 5 engage with the internal cogs 21 of the gear plate 2 so that the reclining apparatus 105 is in a locked state. In this state, when the passenger operates the operation lever 107 against the force of the spiral springs 7, the cam 6 and the lever plate 8 rotate together (rotate in the counterclockwise direction in FIG. 3), and the pressure applied to the lock gear 5 by the cam 6 is released. At the same time, the protrusions 52 of the lock gears 5 are guided by guide holes 81 of the lever plate 8 so that the lock gears 5 move toward the center shaft 106. Then, the engagement between the external cogs 51 of the lock gears 5 and the internal cogs 21 of the gear plate 2 is released so that the reclining apparatus 105 becomes of a state where the adjustment is possible from the locked state.

Here, the lock mechanism formed of the above described lock gears 5, the cam 6, the lever plate 8 and the like has a configuration of publicly known lock mechanisms, and the operations of locking and releasing the locking are also publicly known. In addition, when the external cogs 51 of the lock gears 5 are at such locations as to make contact with the arc portions 22 of the gear plate 2, the reclining apparatus 105 is not locked, and this implements a state where the backrest 102 is in a state corresponding to the lock free range b of FIG. 1.

Figure 4:
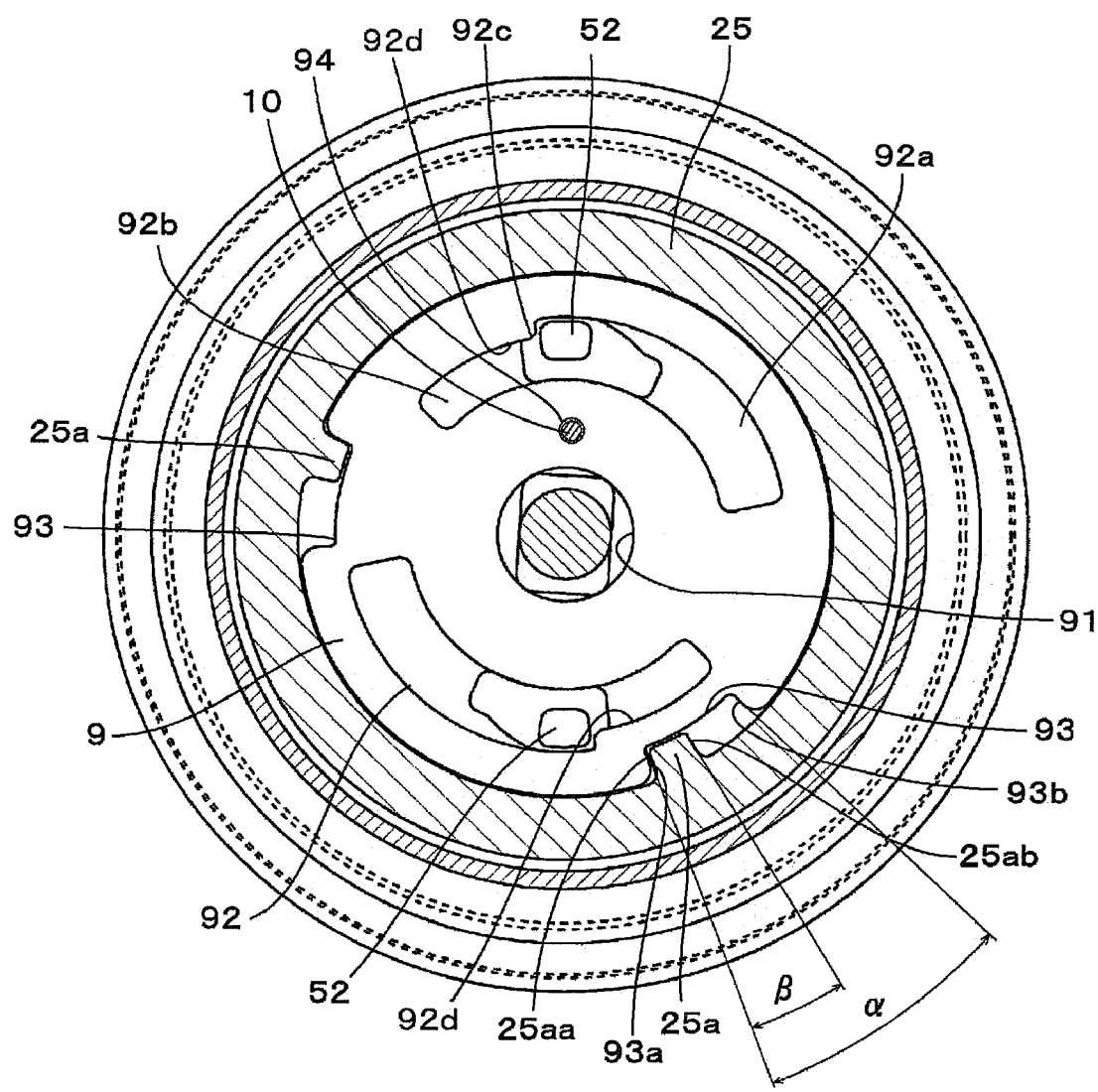
FIG. 4 is a cross sectional diagram showing the portion along line Y2-Y2 in FIG. 2.

Next, the memory plate 9 and the coil spring 10, which are main components of the neutral position return mechanism, are described. The memory plate 9 is made of a plate material in approximately disc form as described above. The memory plate 9 according to the present embodiment is pressed by the coil spring 10 in such a direction that the memory plate rotates (see FIG. 2). As shown in FIG. 4, the memory plate 9 is provided with a circular hole 91 at the center through which the center shaft 106 penetrates so as to be rotatable and a pair of long holes 92 in approximately arc form, which are located rotationally symmetric with the circular hole 91 at the center. In addition, two notches 93 are provided at an appropriate interval in the outer periphery of this memory plate 9, and a hole 94 is provided between the circular hole 91 and one long hole 92. As described below, one end of the coil spring 10 engages with this hole 94.

As shown in FIG. 4, the long holes 92 of the above described memory plate are made to have a wide portion 92a and a narrow portion 92b such that a portion of the periphery in approximately arc form on the outside of the wide portion 92a in the direction of the radius in the direction in which the backrest reclines backward (counterclockwise direction in the figure) protrudes in the direction toward the center so as to be a guide portion 92d, and thus, the above described narrow portion 92b is provided. In addition, the protrusions 52 of the lock gears 5 loosely engage with these long holes 92 so that the movement of the lock gears 5 in the direction of the radius can be guided. In addition, stoppers 25a, which are formed in the second step 25 of the gear plate 2 so as to protrude in the direction toward the center, loosely engage with the above described notches 93 and 93, and thus, the range of the rotation of the memory plate 9 relative to the gear plate 2 is restricted. In the present embodiment, the gear plate 2 is secured to the backrest, and thus, the gear plate 2 rotates as this backrest reclines. Therefore, the wide portions 92a in the above described guide portions 92d are located in the direction in which the backrest reclines backward. Here, the present invention is not limited to this, and the base plate 1 may be secured to the backrest. In this case, the wide portions 92a in the above described guide portions 92d are located in the direction in which the backrest reclines forward.

The above described wide portions 92a have approximately the same angular width (length) so as to correspond to the range of adjustment a shown in FIG. 1, and the narrow portions 92b also have approximately the same angular width (length) so as to correspond to the free width b. In addition, when the protrusions 52 of the lock gears 5 are located in the above described wide portions 92a, the protrusions do not make contact with the periphery in approximately arc form in the wide portions 92a, and thus the cam holes 81 of the lever plate 8 allow the lock gear 5 to move in the direction of the radius of the gear plate 2 without hindrance. In addition, when the protrusions 52 of the lock gears 5 are located within the narrow portions 92b, the above described guide portions 92d prevent the lock gears 5 from moving in the direction of the radius of the gear plate 2 irrelevant of the locations of the cam holes 81 of the lever plate 8, and thus the external cogs 52 of the lock gears 5 do not engage with the internal cogs 21 of the gear plate 2.

The above described coil spring 10 is a twisted coil spring which presses the memory plate 9 so that the memory plate rotates in such a direction that the protrusions 52 of the lock gears 5 disengage from the guide portions 92d, and as shown in FIG. 2, has a center diameter through which the center shaft 106 can penetrate and is contained in a recess 26 created at approximately the center of the third step 25 of the gear plate 2. In addition, one end of the coil spring 10 engages with the hole 94 provided in the above described memory plate 9, and the other end engages in a hole 26a provided in the bottom portion of the recess 26 so that the memory plate 9 is set to be always pressed by the coil spring 10 in the counterclockwise direction in the state shown in FIG. 4.

Subsequently, the operation of the reclining apparatus 105, which is formed as described above, is described in reference to FIG. 3. When the operation lever 107 is not operated by a passenger, the spiral springs 7 press the cam 6 and the lever plate, which is integrated with the cam, so that they rotate in the clockwise direction. Therefore, the pressing portions 5a of the two lock gears 5 are pressed against the cam surfaces 6a of the cam 6, and the external cogs 51 of the lock gears 5 engage with the internal cogs 21 of the gear plate 2. Accordingly, the base plate 1 and the gear plate 2 are prevented from rotating relative to each other by means of the lock gears 5, which engage with the guide portions 50a of the base plate 1 so as to be slidable in the direction of the radius.

That is to say, in this state, the reclining apparatus 105 is locked by a publicly known lock mechanism made of the lock gears 5, the cam 6, the spiral springs 7, the lever plate 8 and the like, and the inclination angle of the backrest 102 is fixed. In addition, in the state shown in FIG. 3, the external cogs 51 of the lock gears 5 are located so as to make contact with the arc portions 22 at the end portions of the gear plate 2 in the counterclockwise direction, and the backrest 102 corresponds to the highest raised position A shown in FIG. 1. Here, in this state, the protrusions 52 of the lock gears 5 loosely engage with the cam holes 81 of the lever plate 8, and at the same time, as shown in FIG. 4, are set to be located within the wide portions 92a of the long holes 92 created in the memory plate 9, and thus, neither the cam holes 81 nor the long holes 92 prevent the lock gears 5 from sliding in the direction of the radius.

Next, when the operation lever 107 is rotated (lifted up in the clockwise direction in FIG. 1) through the operation by a passenger in the state where the above described reclining apparatus 105 is locked, the cam 6 and the lever plate 8, which is integrated with the cam, are rotated in the counterclockwise direction against the force of the spiral springs 7 from the state of FIG. 3. Then, the pressure applied to the pressing portions 5a of the two lock gears 5 by the cam surfaces 6a of the cam 6 is released, and at the same time, the protrusions 52 of the lock gears 5 are guided by the cam holes 81 of the lever plate 8 so that the lock gears 5 slide in the direction toward the center shaft 106, and the engagement between the external cogs 51 of these lock gears 5 and the internal cogs 21 of the gear plate 2 is released. As a result, the locking of the reclining apparatus 105 is released, and it becomes possible to adjust the angle of inclination of the backrest 102. In this state, when the backrest 102 is adjusted within the range of adjustment of reclining a of FIG. 1 and the operation of the operation lever 107 is discontinued, the angle of inclination of the backrest 102 is fixed at a readjusted position.

The above described operations relate to the locking and adjusting functions of publicly known lock mechanisms, and in this state, the protrusions 52 of the lock gears 5 which loosely engage with the long holes 92 created in the memory plate 9 through the cam holes 81 of the lever plate 8 are set to always be located within the wide portions 92a. Therefore, the operation of the two lock gears is not limited by the long holes 92 created in the memory plate 9, and the memory mechanism made of the memory plate 9 and the coil spring 10 does not relate to the above described operations.

Next, the operation of the neutral position return mechanism which characterizes the present invention is described.

The range of the angle b shown in FIG. 1 is a lock free range in which the backrest 102 is not locked and an unlocked state is maintained even when the fingers are released from the operation lever 107, and the backrest 102 is first locked in the neutral position C (position which is reclined backward by a predetermined angle from the initial locked position) in the figure when the backrest 102 is reclined backward from the lock free range b in the figure in the state where the fingers are released.

FIGS. 5 to 8 are diagrams showing the operations of the gear plate 2, the lock gears 5, the cam 6, and the memory plate 9 during the period where the above described backrest 102 rotates from the lock free range b to the neutral position C so that the reclining apparatus is locked. Here, for the purpose of convenience for the description, the parts other than the above are omitted. In addition, the left side and right side of FIGS. 5 to 8 are shown opposite to those of FIGS. 1 to 4 so that the direction of rotation corresponds to that of the backrest 102 in FIG. 1, and FIGS. 5 to 8 show the parts in such a manner that the parts in FIG. 3 are seen from the rear side of the figure.

Figure 5:
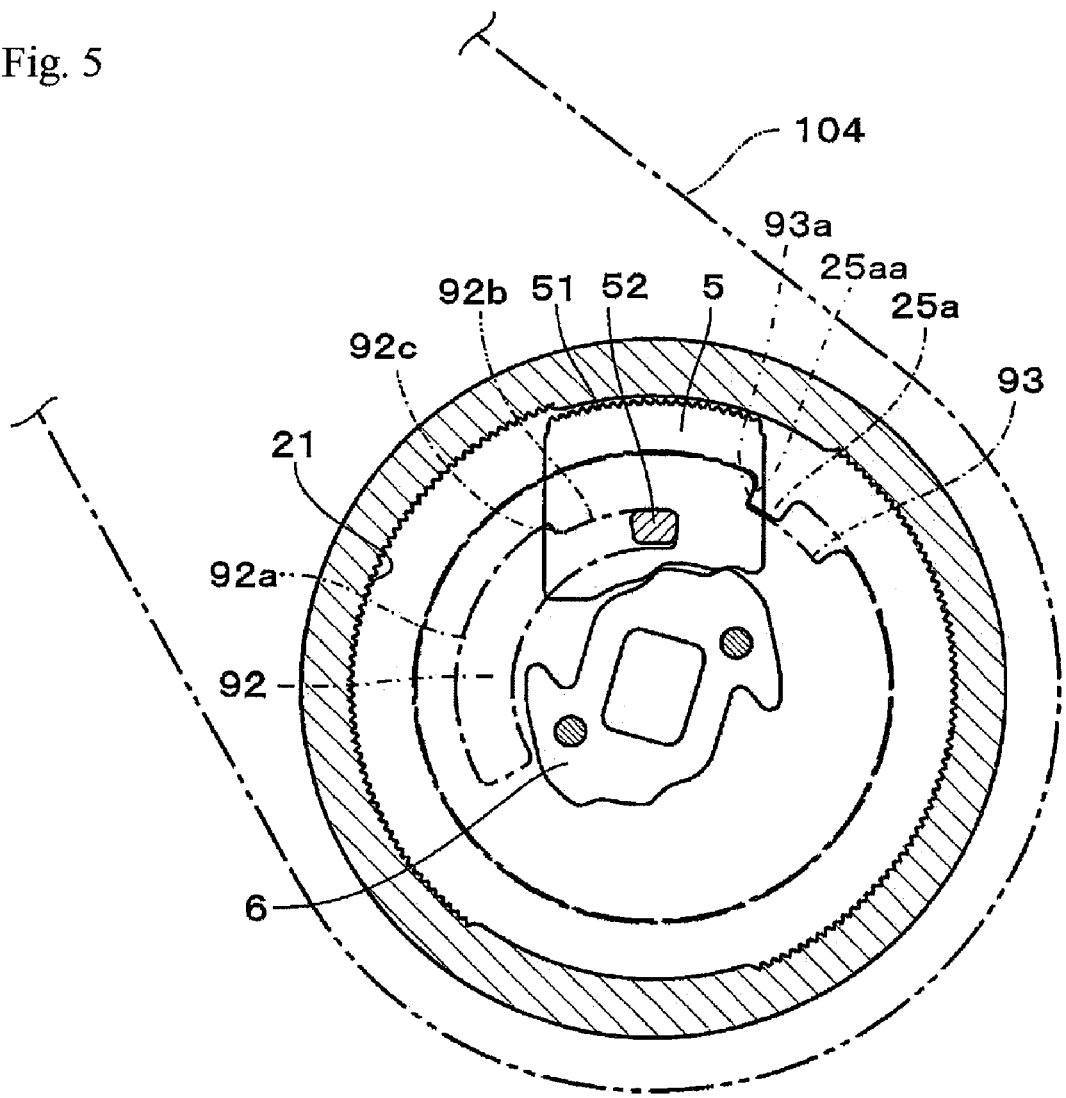
FIG. 5 is a diagram showing the positional relationship between the respective members inside the reclining apparatus when the backrest is in a state of the most forward reclined position B in FIG. 1.

FIG. 5 shows the backrest 102 shown in FIG. 1 in a state of being at the most forward position, which is the front end of the lock free range b. This is the state where the operation lever 107 is pulled up in the same manner as in the operation of conventional adjustments of inclination so that the lock gears 5 and 5 retreat in the direction toward the center along the radius and the backrest 102 is reclined forward. When the backrest 102 is reclined forward in a state where the lock gears 5 and 5 do not engage with the internal cogs 21, the gear plate 2 attached to the backrest 102 rotates together, and the memory plate 9 also rotates together with the gear plate 2 in a state where one side 25aa of one of the engaging portions 25a in the third step 25 makes contact with an engaging end 93a of the notch 93 of the memory plate 9.

In addition, when the memory plate 9 rotates in the direction of being reclined forward (counterclockwise direction in the figure), the protrusions 52 of the lock gears 5 are pressed toward the center in the direction of the radius by inclining portions 92c of the long holes 92 so as to be located in the narrow portions 92b. When the protrusions 52 of the lock gears 5 are located in the above described narrow portions 92b, the movement of the protrusions 52 is restricted by the guide portions 92d of the above described narrow portions 92b, and the backrest 102 is then not locked even when the fingers are released from the operation lever so that the force of the spiral springs 7 rotates the cam 6 and pushes the lock gears 5 outward in the direction of the radius. Passengers usually get in and leave from the rear seat in this state.

Figure 6:
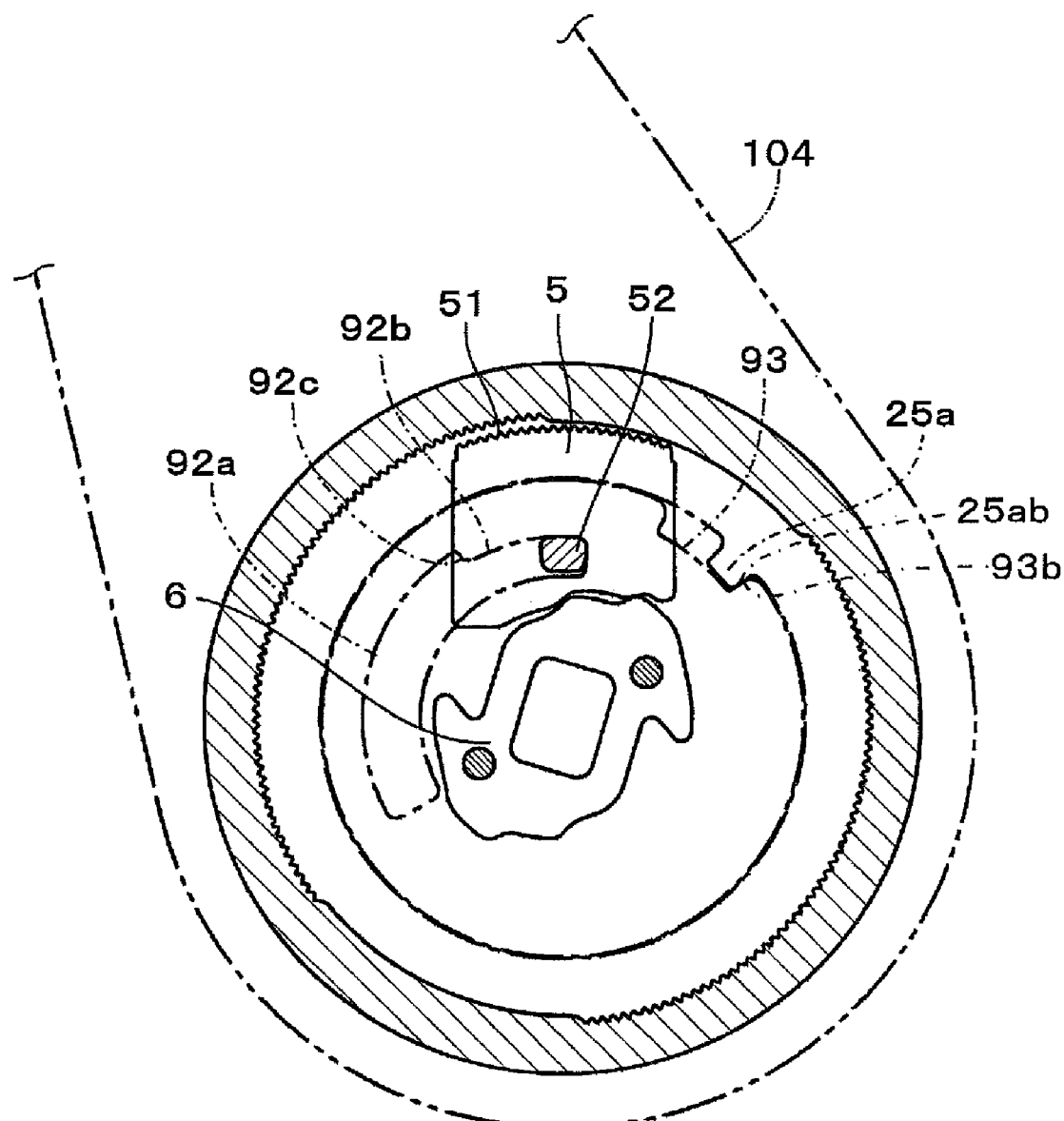
FIG. 6 is a diagram showing the positional relationship between the respective members inside the reclining apparatus when the backrest is in a state where the backrest is in the middle of being reclined from the state in FIG. 5.

Next, in order for passengers to sit in these seats in the state of FIG. 5, it is necessary for the backrest 102 of this seat to be reclined backward. FIG. 6 shows the backrest 102 in a state where the backrest rotates so as to be reclined backward by the difference in the angle α-β between a predetermined angle range α of the above described notch 93 and a predetermined angle range β of the above described engaging portion 25a after starting to return from the state of FIG. 5. During this period, only the backrest 102 and the gear plate 2 rotate. This is because in this stage the spiral springs 7 rotate the cam 6 and press the lock gears 5 outward in the direction of the radius in such a manner that the frictional force, which is created when the respective protrusions 52 press the above described narrow portions 92b, is greater than the force of the coil spring 10, which presses the memory plate 9 so that the memory plate rotates in such a direction as to be reclined backward, and thus, the memory plate 9 is maintained at the location of FIG. 5. Here, when the gear plate 2 rotates by the difference in the angle α-β between a predetermined angle range α of the notch 93 and a predetermined angle range β of the above described engaging portion 25a, the other side 25ab of the engaging portion 25a of the second step 25 in the gear plate 2 makes contact with the engaging end 93b of the notch 93 in the memory plate 9.

Figure 7:
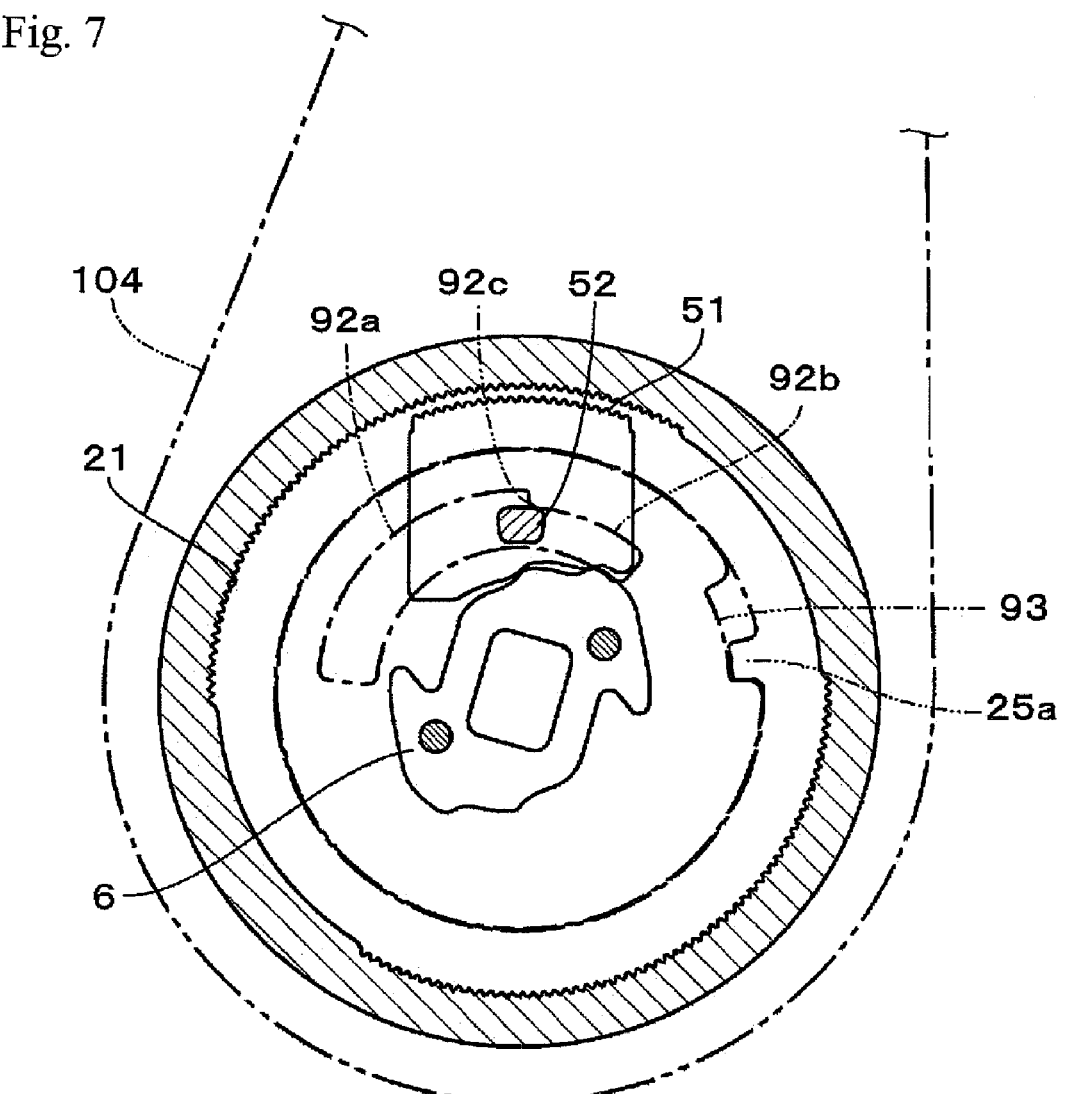
FIG. 7 is a diagram showing the positional relationship between the respective members inside the reclining apparatus when the backrest is further reclined backward from the state in FIG. 6 so as to be in a state directly before the backrest is returned and secured to the neutral position.

In addition, when the backrest 102 is further reclined backward from the state where the other side 25ab of the engaging portion 25a in the third step 25 of the gear plate 2 makes contact with the engaging end 93b of the notch 93 in the memory plate 9 (FIG. 6), the memory plate 9 rotates together with the backrest 102 and the gear plate 2, and the protrusions 52 and 52 of the lock gears 5 and 5 slide over the guide portions 92d of the long holes 92. When the backrest 102 rotates (is reclined backward) from the state where the protrusion 52 of the lock gear 5 shown in FIG. 7 is in the inclining portion 92c provided at the end of the guide portion 92d where the narrow portion 92b and the wide portion 92a meet in the long hole 92 of the memory plate 9, contact between the long hole 92 and the protrusion 52 is disengaged, the lock gear 5 is pressed outward in the direction of the radius when the cam 6 rotates by means of the spiral springs 7, and the internal cogs 21 of the gear plate 2 and the external cogs 51 of the lock gear 5 engage so that the backrest 102 is locked.

Figure 8:
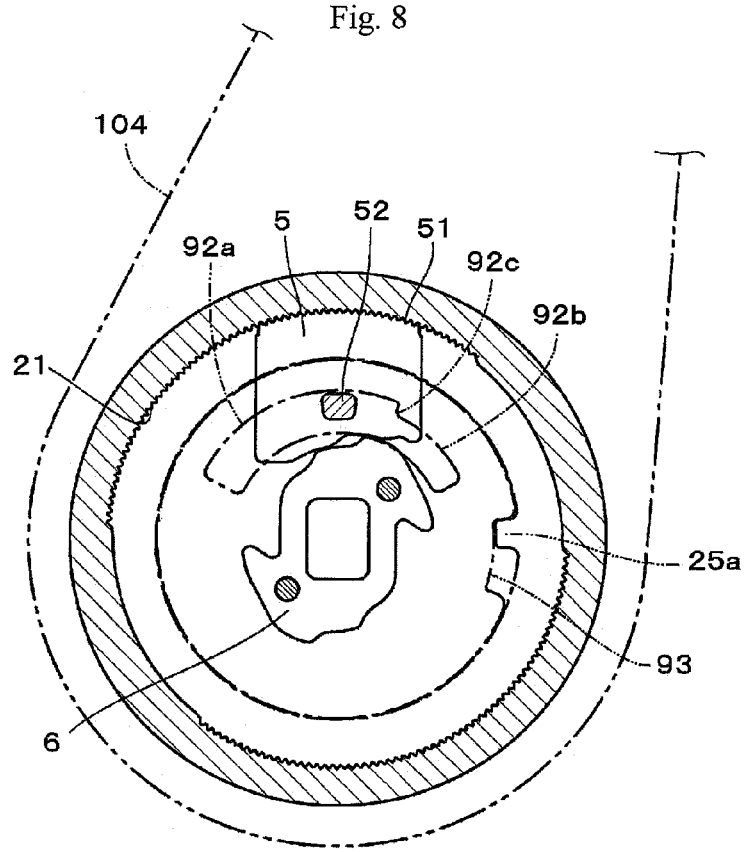
FIG. 8 is a diagram showing the positional relationship between the respective members inside the reclining apparatus when the backrest is in a state of being returned and secured to the neutral position.

In addition, as shown in FIG. 8, contact between the long hole 92 and the protrusion 52 is disengaged, and thus, the frictional force caused by the above described protrusions 52 when pressing the guide portion 92d is eliminated, and therefore, the force of the coil spring 10 rotates the memory plate 9 in the direction in which the backrest is reclined backward (counterclockwise direction in the figure) until a side 25aa of one of the engaging portions 25a in the third step 25 makes contact with the engaging end 93a of the notch 93 in the memory plate 9. As a result, there is a difference in the angle of rotation between the memory plate 9 and the gear plate 2, which is the difference in the angle α-β between a predetermined angle range α of the above described notch 93 and a predetermined angle range β of the above described engaging portion 25a, when the backrest 102 becomes of the state shown in FIG. 6 from the most forward reclined position B (state shown in FIG. 5), and thus, the angle of inclination of the backrest 102 shown in FIG. 8 becomes the angle by which the reclining apparatus reclines backward by the angle of α-β from the initial position which can be locked when the protrusion 52 of the lock gear 5 is in the wide portion 92a of the long hole 92.

Though in conventional reclining apparatuses a lock free range is created when a lock gear 5 rides on an arc portion 22 where no internal cogs 21 are formed on the inner periphery of the gear plate 2, a lock free range can be created when the protrusion 52 of the lock gear 5 is pulled toward the center in the direction of the radius by the long hole 92 in the memory plate 9, and therefore, the above described arc portion 22 is not necessary in the reclining apparatus according to the present invention, but it is preferable to provide such an arc portion 22 in order to ensure the engagement between the lock gear 5 and the gear plate 2 in the vicinity of the highest raised position A.

Figure 9:
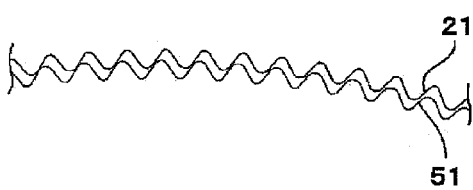
FIG. 9 is a plan diagram showing the vicinity of the highest raised position in the case where a protrusion rides on an inclining portion.
Figure 9:
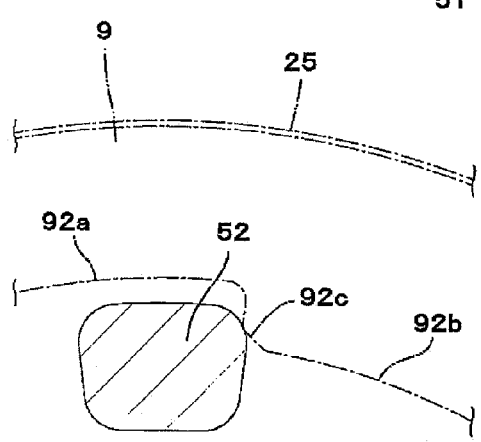

This is because the lock free range b, in the case where no arc portion 22 is provided as described above, is created by the long hole 9, and therefore, the inclining portion 92c of the long hole 92 is located nearby the side of the protrusion 52 in the highest raised position A. This inclining portion 92c creates an error in the position in the direction of rotation resulting from the accumulated errors in the process precision of the memory plate 9 and the process precision in the engaging portion 25*a* of the gear plate 2 and the notch 93 of the memory plate 9, and therefore, as shown in FIG. 9, the protrusion 52 rides on the above described inclining portion 92*c* in the vicinity of the highest raised position A, so there is a risk that the lock may become incomplete.

Therefore, an arc portion 22 is provided in the gear plate 2 in the same manner as in the prior art, and the guide portion 92*d* is provided so as to shift in such a direction that the riding of the protrusion 52 over the inclining portion 92*c* (clockwise direction in FIG. 9) so that the protrusion 52 makes contact with the inclining portion 92*c* after the lock gear 5 rides on the above described arc portion 22 when the backrest 102 reclines forward, and thus, the engagement between the lock gear 5 in the vicinity of the highest raised position A and the gear plate 2 can be ensured. Here, the amount by which the inclining portion 92*c* is shifted in the direction of rotation can be adjusted by adjusting the neutral position to which the system returns with the difference in the angle between the engaging portion 25*a* of the gear plate 2 and the notch 93 of the memory plate 9.

Subsequently, the reclining apparatus according to the second embodiment is described in reference to FIGS. 10 to 12. These FIGS. 10 to 12 correspond to FIGS. 2 and 4 to 9 relating to the first embodiment. In this embodiment, the forms of the memory plate 9 and the coil spring 10 are different from those in the first embodiment. In the following, these differences are described specifically.

Figure 10:
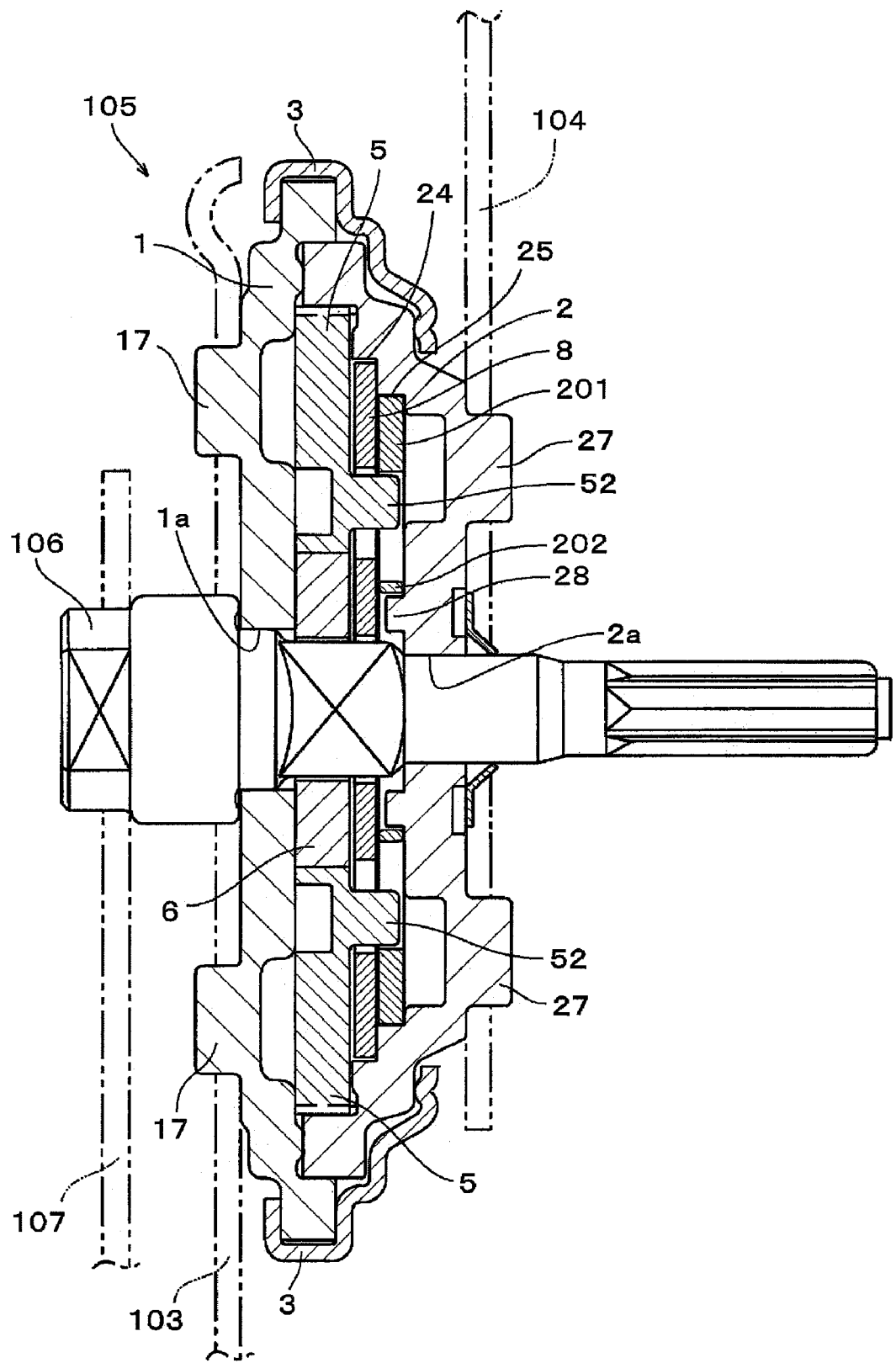
FIG. 10 is a cross sectional diagram showing the reclining apparatus according to the second embodiment, which corresponds to FIG. 2 relating to the first embodiment.
Figure 11:
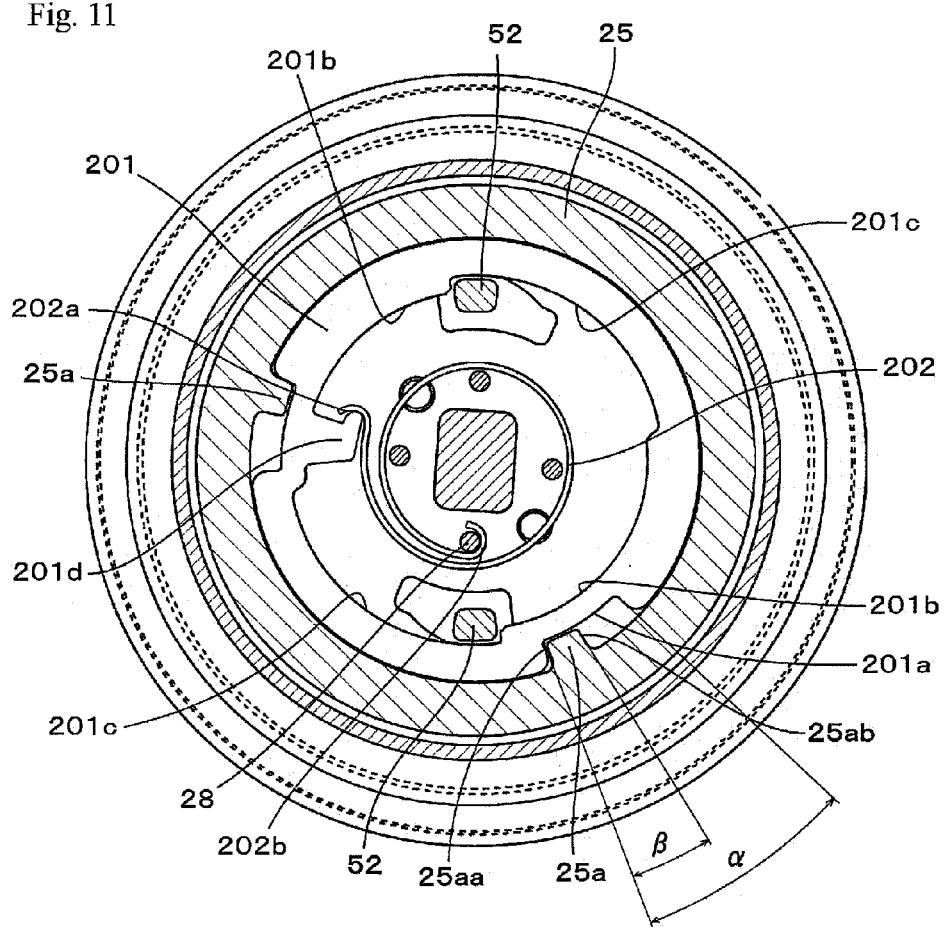
FIG. 11 is a cross sectional diagram showing the reclining apparatus according to the second embodiment, which corresponds to FIG. 4 relating to the first embodiment.

First, as shown in FIGS. 10 and 11, the memory plate 201 in the present embodiment is in approximately ring form (spiral form) with the center shaft 106 at the center. Two notches 201*a* at an appropriate interval are provided in the outer periphery in the same manner as in the memory plate 9. In addition, guide portions 201*b* in approximately arc form for restricting the lock gear 5 from moving outward in the direction of the radius when the protrusions 52 of the above described lock gear 5 make contact and a hook piece 201*d* for engaging the spiral spring 202 are formed on the inner periphery in approximately ring form.

In addition, when the protrusions 52 of the lock gear 5 are in a range where the guide portions 201*b* are formed, the lock gear 5 is restricted from moving in the direction of the radius of the gear plate 2 irrelevant of the positions of the cam holes 81 in the lever plate 8, and the external cogs 52 of the lock gear 5 do not engage with the internal cogs 21 of the gear plate 2. In addition, when the protrusions 52 of the lock gear 5 are not located in the inner peripheral portions 201*c*, which are not the guide portions 201*b*, the protrusions do not make contact with the periphery in approximately arc form and the lock gear 5 is moved in the direction of the radius of the gear plate 2 without hindrance by the cam holes 81 in the lever plate 8.

Next, the end on the outside of the spiral form of the spiral spring 202 is bent backward in the direction opposite to the direction in which the spiral winds while the end on the center side is bent in the same direction as the direction in which the spiral winds so that the end on the outside engages with the hook piece 201*d* of the above described memory plate 201 while the end on the center side engages with a protrusion 28 in approximately columnar form provided in the bottom portion of the gear plate 2. A number of protrusions 28 other than the above described protrusion 28 with which the spiral spring 202 engages are provided so as to prevent the position of the spiral spring 202 from shifting and can elastically change in form efficiently.

The operations of the above describe memory plate 201 and the spiral spring 202 are the same as of the memory plate 9 and the coil spring 10, and therefore, the descriptions thereof are omitted, but a spring member for pressing the memory plate can be installed in a space having the same plate thickness as the memory plate 201, which cannot be provided in the combination of the memory plate 9 and the coil spring 10, and therefore, the thickness of the reclining apparatus in the direction of the axis can be reduced.

Figure 12:
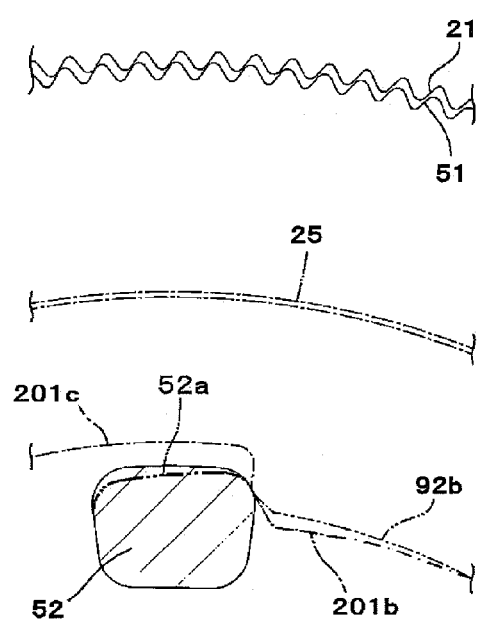
FIG. 12 is a plan diagram showing an embodiment where the periphery reaching the end portion of the guide portion protrudes toward the center from the arc of the guide portion having the center shaft at the center.

FIG. 12 is a plan diagram illustrating an embodiment of the invention in which FIG. 12 is a plan diagram corresponding to FIG. 9. The periphery reaching the end portion of the guide portion 201*b* shown in FIG. 12 protrudes toward the center from the arc of the guide portion with the center shaft at the center. By having this configuration, the memory plate 201 prevents the memory plate 201 from rotating together with the gear plate 2 within a certain range where the memory plate 201 is rotatable relative to the gear plate 2.

This is a configuration in which the location where the external cogs 51 of the lock gear 5 engage with the internal cogs 21 of the gear plate 2 shifts from the neutral position by the amount of which the memory plate rotates through the friction between the periphery of the memory plate 201 and the gear plate 2 while the notch 201*a* of the memory plate 201 does not make contact with the engaging portion 25*a* of the gear plate 2, and therefore, the notch 201*a* of the memory plate makes contact with the engaging portion 25*a* of the gear plate before the protrusions 52 of the lock gear 5 disengage from the guide portions 201*b* due to the guide portion which protrudes in order to provide resistance against the rotation of the memory plate 201.

In addition, the periphery 52*a* through which a protrusion 52 of the lock gear 5 makes contact with the above described guide portion 201*b* is inclined along the form in which the above described guide portion 201*b* protrudes as shown by two dot chain lines in FIG. 12, and therefore, the guide portion 201*b* makes contact with the periphery 52*a* of the protrusion 52 through a surface until the moment when the protrusion 52 is removed from the guide portion 201*b*, and thus, the memory plate 201 can be prevented from rotating together with the gear plate 2 without fail within a certain range where the above described memory plate 201 is rotatable relative to the gear plate 2.

What is claimed is:

1. A reclining apparatus comprising:
a base plate in approximately disc form secured to either a seat cushion or a backrest of a seat;
a gear plate in approximately disc form having internal cogs which is combined with the base plate so as to be rotatable and face the base plate;
a number of lock gears having external cogs which can engage with the internal cogs of said gear plate, which are placed within a guide portion made of at least a pair of protrusions provided in said base plate so as to be moveable in the direction of the radius in the base plate;
a cam for controlling the movement of said lock gear in the direction of the radius so that the lock gear engages with the internal cogs of the gear plate;
a spring for pressing said cam so that the cam rotates in such a direction that said lock gear engages with said internal cogs;
a lever plate which rotates together with said cam and engages with a protrusion provided in said lock gear so as to control the movement of the lock gear inward in the direction of the radius;

a center shaft which penetrates through approximately the center of said base plate and gear plate so as to be rotatable together with the cam; and an operation member which is connected to the center shaft so as to rotate and drive the center shaft against the force of said spring, characterized in that a memory plate in approximately disc form having said center shaft at the center and a spring member for pressing the memory plate in one direction so that the memory plate always rotates intervene between said base plate and gear plate, a guide portion, which is a long hole in approximately arc form for restricting the movement of the lock gear outwards in the direction of the radius through contact with the protrusion of said lock gear, is provided inside the disc of the memory plate, at least one notch is provided in the outer periphery of the memory plate so that an engaging portion provided in and protruding from said gear plate enters into the notch and the memory plate is rotatable relative to the gear plate within the range of the notch, when the backrest is in a range from the most forward reclined position to the highest raised position, the protrusion of said lock gear makes contact with said guide portion so as to form a lock free range where the external cogs of the lock gear are released from the engagement with the internal cogs of the gear plate, when the backrest is in a range from the highest raised position to the most backward reclined position, the protrusion of said lock gear is released from making contact with said guide portion so as to form a range of the adjustment where the external cogs of the lock gear engage with the internal cogs of the gear plate, said spring member presses the memory plate so that the memory plate rotates in such a direction that the protrusion of the lock gear disengages from the guide portion, and when the backrest is reclined backward in a state where the protrusion of said lock gear makes contact with the guide portion of said memory plate, the memory plate rotates together with the base plate against the force of said spring members so that the protrusion of said lock gear is released from making contact with said guide portion and the external cogs of the lock gear engage with the internal cogs of the gear plate.

2. The reclining apparatus according to claim 1, characterized in that said gear plate is formed in approximately bowl form having steps in stair form, in which a first step where said internal cogs are formed around the inner periphery of the opening, a second step of which the radius of the circumference is smaller than that of the first step and which slides against the outer periphery of said lever plate, and a third step of which the radius of the circumference is smaller than that of the second step and which slides against the outer periphery of said memory plate are formed, and said spring member is provided between the memory plate and the gear plate.

3. The reclining apparatus according to claims 1, characterized in that an arc portion where no internal cogs are formed is provided in said gear plate, and this arc portion is thicker in the direction of the radius than the internal cogs portions, an inclined portion, which inclines outward in the direction of the radius, is provided in an end portion of the guide portion provided in said memory plate, and when the backrest is reclined forward within said lock free range, the external cogs of the lock gear ride on said arc portion, and after that, the protrusion of the lock gear is moved towards the center along the radius by said inclined portion so as to be guided to and make contact with the guide portion.

4. The reclining apparatus according to claim 1, characterized in that the periphery which reaches the end portion of said guide portion protrudes towards the center from the arc of the guide portion having the center shaft at the center.

5. A reclining apparatus comprising:

a base plate in approximately disc form secured to either a seat cushion or a backrest of a seat;

a gear plate in approximately disc form having internal cogs which is combined with the base plate so as to be rotatable and face the base plate;

a number of lock gears having external cogs which can engage with the internal cogs of said gear plate, which are placed within a guide portion made of at least a pair of protrusions provided in said base plate so as to be moveable in the direction of the radius in the base plate;

a cam for controlling the movement of said lock gear in the direction of the radius so that the lock gear engages with the internal cogs of the gear plate;

a spring for pressing said cam so that the cam rotates in such a direction that said lock gear engages with said internal cogs;

a lever plate which rotates together with said cam and engages with a protrusion provided in said lock gear so as to control the movement of the lock gear inward in the direction of the radius;

a center shaft which penetrates through approximately the center of said base plate and gear plate so as to be rotatable together with the cam; and an operation member which is connected to the center shaft so as to rotate and drive the center shaft against the force of said spring, characterized in that a memory plate in approximately ring form having said center shaft at the center and a spring member for pressing the memory plate in one direction so that the memory plate always rotates intervene between said base plate and gear plate, a guide portion in approximately arc form for restricting the movement of the lock gear outwards in the direction of the radius through contact with the protrusion of said lock gear is formed in the inner peripheral portion of the ring of the memory plate, at least one notch is provided in the outer periphery of the memory plate so that an engaging portion provided in and protruding from said gear plate enters into the notch and the memory plate is rotatable relative to the gear plate within the range of the notch, when the backrest is in a range from the most forward reclined position to the highest raised position, the protrusion of said lock gear makes contact with said guide portion so as to form a lock free range where the external cogs of the lock gear are released from the engagement with the internal cogs of the gear plate, when the backrest is in a range from the highest raised position to the most backward reclined position, the protrusion of said lock gear is released from making contact with said guide portion so as to form a range of the adjustment where the external cogs of the lock gear engage with the internal cogs of the gear plate, said spring member presses the memory plate so that the memory plate rotates in such a direction that the protrusion of the lock gear disengages from the guide portion, and when the backrest is reclined backward in a state where the protrusion of said lock gear makes contact with the guide portion of said memory plate, the memory plate rotates together with the base plate against the force of said spring members so that the protrusion of said lock gear is released from making contact with said guide portion and the external cogs of the lock gear engage with the internal cogs of the gear plate.

6. The reclining apparatus according to claim 5, characterized in that said gear plate is formed in approximately bowl form having steps in stair form, in which a first step where said internal cogs are formed around the inner periphery of the opening, a second step of which the radius of the circumference is smaller than that of the first step and which slides against the outer periphery of said lever plate, and a third step of which the radius of the circumference is smaller than that of the second step and which slides against the outer periphery of said memory plate are formed, said spring member is a spiral spring in such a form that the end on the outer side of the spiral is bent backward in the direction opposite to the direction in which the spiral winds and the end on the center side is bent in the same direction as the direction in which the spiral winds, where the end on the outer side engages with a hook portion in hook form provided on the inner periphery of said memory plate and the end on the center side engages with a protrusion in approximately columnar form provided in the bottom portion of the gear plate, and said spiral spring is placed in said third step.

* * * * *